United States Patent Office 3,244,230
Patented Apr. 5, 1966

3,244,230
SEALING OF DEEP PERMEABLE EARTH
FORMATIONS
Lorld G. Sharp, Irving, Tex., assignor to Socony Mobil
Oil Company, Inc., a corporation of New York
No Drawing. Filed Sept. 27, 1962, Ser. No. 226,739
9 Claims. (Cl. 166—30)

This invention relates to the treatment of subterranean formations and relates more particularly to sealing deep subterranean formations penetrated by a well to reduce the permeability of these formations to the flow of a fluid.

For many purposes, wells are drilled into the earth to penetrate formations which are located at a substantial distance below the surface of the earth. For example, wells are drilled from the surface of the earth to comparatively deep formations containing petroleum or gas for the purpose of producing the petroleum or gas from these formations. These wells may be production wells or injection wells. In production wells, the petroleum or gas flows by natural means, or is caused to flow by artificial means, from the formation into the well and is recovered from the well. In injection wells, fluid is injected into the formation from the well to displace the contained petroleum or gas through the formation to a production well from which it is recovered.

Various of the subterranean formations, in addition to the producing formation, penetrated by the production or injection wells are permeable to the flow of fluid. Thus, in a production well, the petroleum or gas which has entered the well from the producing formation may be lost by flow into one or more of these other permeable formations. Further, where these permeable formations contain a fluid such as water, the water can flow into the well and is produced along with the petroleum or gas necessitating subsequent separation of the water. In an injection well, the injected fluid can flow into these other permeable formations and, to the extent that such flow occurs, the function of the injection fluid to displace petroleum or gas is not performed.

The producing formation itself may be productive of an undesired fluid along with the petroleum or gas. For example, the producing formation may be subject to water coning. In water coning, water flows from the lower portion of the formation into the well while the petroleum or gas flows from the upper portion of the formation into the well. The producing formation may also be subject to gas coning. In gas coning, gas flows from the upper portion of the formation while petroleum flows from the lower portion of the formation.

The loss of petroleum or gas, or injection fluid, into a permeable formation, or the entrance of water into the well from a permeable formation, can be reduced by reducing the permeability to the flow of fluid of these formations. Further, water coning and gas coning can be reduced by reducing the permeability to the flow of fluid of the lower or upper portions, respectively, of the producing formations. Various methods of reducing the permeability of permeable formations involving the introduction of a single fluid into the formations, to form a sealing agent, particularly a silica hydrogel, within the formations are known.

As is known, a geothermal gradient exists within the earth. As the depth of the formation increases below the surface layers of the earth, the temperature of the formation gradually increases. Ordinarily this increase in temperature is of the order of 1° F. for each 60 feet of depth. Accordingly, at depths of the order of 5000 feet, the temperature can be in excess of about 145° F. While many of the methods heretofore employed for sealing permeable formations penetrated by a well have been effective in formations at a temperature less than about 145° F., these methods are not effective in formations in excess of this temperature. For example, at the higher temperatures, the silica hydrogel forms at such a rapid rate that the reaction is complete before the fluid can be introduced into the formation. A measure of relief may be obtained by reducing the concentration in the fluid of the reactants which form the silica hydrogel. However, reduction in the concentration of the reactants is not always satisfactory since the extent to which the formation is sealed is likewise reduced.

It is an object of this invention to provide a method for reducing the permeability to the flow of fluid of a deep subterranean formation penetrated by a well.

It is another object of this invention to provide a method for reducing the permeability to the flow of fluid of a subterranean formation which is at a temperature in excess of about 145° F.

It is another object of this invention to provide a method for reducing the flow of water from a subterranean formation at a temperature in excess of about 145° F. into a well which is productive of petroleum or gas.

It is another object of this invention to reduce the loss through porous subterranean formations at temperatures in excess of about 145° F. of fluid injected into an injection well to displace petroleum or gas through the formation to a production well.

It is another object of this invention to provide a method for reducing water coning in a producing formation which is at a temperature in excess of about 145° F.

It is another object of this invention to provide a method for reducing gas coning in a producing formation which is at a temperature in excess of about 145° F.

These and further objects of the invention will become apparent from the following detailed description.

In accordance with the invention, a subterranean formation at a temperature in excess of about 145° F., penetrated by a well, and permeable to the flow of fluid is treated to reduce its permeability to the flow of fluid by introducing into the formation through the well an aqueous solution of sodium silicate and urea.

The aqueous solution of the sodium silicate and the urea begins to react under the temperature conditions within the subterranean formation to form a hydrosol of silicic acid. This hydrosol, with time, converts into a hydrogel whose viscosity is many times greater than that of the hydrosol. The hydrogel, or silica gel, formed within the formation provides a firm unitary structure which is more or less impervious to fluid. Accordingly, by the process of the invention the permeability of a subterranean formation at a temperature in excess of about 145° F. to the flow of fluid is reduced.

The extent to which the permeability of the formation is reduced is proportional to the amount of the aqueous solution, as well as to the amount of the sodium silicate and the amount of the urea in the solution, which is introduced into the formation. Accordingly, the extent to which the permeability of the formation is reduced can be controlled as desired.

Various factors control the time required for the reduction in the permeability of the formation to occur. The hydrogel, or silica gel, forms more rapidly as the ratio of urea to sodium silicate in the solution introduced into the formation is increased. Further, the hydrogel forms more rapidly as the temperature in the formation increases. By suitably selecting the initial concentration of the sodium silicate and of the urea, for any given temperature of the formation, the time required for the hydrogel to form may be preselected. Accordingly, for the treatment of any subterranean formation, by selection of the amounts of the materials in the solution introduced into the formation, a suitable time may be assured for introducing the solution into the formation without the risk of the hydrogel being formed prematurely.

A particular feature of the process resides in the fact that the sodium silicate and the urea will not react to any significant extent to form the hydrosol or the hydrogel until its temperature becomes in excess of about 145° F. Accordingly, the solution of the sodium silicate and the urea may be preformed any desired time prior to introducing the solution into the formation to be treated. Further, since reaction does not occur to any significant extent until the temperature of the solution is in excess of about 145° F., the risk is minimized of premature setting of the hydrogel during pumping of the solution from the surface of the earth and introduction into the subterranean formation to be treated.

The sodium silicate employed in the process of the invention may be any type of sodium silicate heretofore employed in analogous processes. The sodium silicate employed may be a commercial aqueous solution. In these solutions, the concentration of the sodium silicate can be between about 35 and 45 percent by weight. The molar ratio of the sodium oxide to the silicon dioxide in the sodium silicate may be within the range of about 1:3.0 to 1:4.0. For example, the molar ratio of sodium oxide to silicon dioxide may be within the range of 1:3.0 to 1:3.5. Preferably, the molar ratio of sodium oxide to silicon dioxide is 1:3.22.

In the practice of the invention, the aqueous solution introduced into the porous formation will contain at least about 2.75 percent by weight of the sodium silicate. The amount of sodium silicate in the aqueous solution may be as high as about 30 percent by weight. On the other hand, the viscosity of an aqueous solution containing about 30 percent by weight of sodium silicate is sufficently high to present difficulty in pumping. Accordingly, depending upon the available pumping pressure, it may be desirable to employ solutions wherein the amount of sodium silicate does not exceed about 27 percent by weight.

The amount of urea in the aqueous solution introduced into the formation should be at least about 1.5 percent by weight. However, as stated hereinabove, the hydrogel, or silica gel, forms more rapidly as the ratio of urea to sodium silicate in the solution introduced into the formation is increased. Further, as indicated hereinabove, the hydrogel forms more rapidly as the temperature, and the pressure, in the formation increases. Accordingly, as the temperature in the formation increases, the amount of urea in the solution may be decreased. For the treatment of formations having temperatures of the order of 145° F., the amount of the urea in the solution should be at least about 16 percent by weight. On the other hand, for the treatment of formations having higher temperatures, the amount of urea may be decreased. At formation temperatures of the order of 170° F. and above, the amount of the urea in the solution may be decreased to about 9 percent by weight. At formation temperatures as high as 300° F., the amount of the urea in the solution may be as low as 1.5 percent by weight. On the other hand, amounts of urea in excess of 25 percent by weight provide no advantage from the standpoint of the setting time or the strength of the hydrogel.

Any suitable procedure may be employed for introducing the solution of sodium silicate and urea from the well into the permeable formation. For example, the formation, or a portion thereof, to be treated may be isolated from the remainder of the formations with a packer or packers and the solution introduced into the isolated area from tubing extending from the surface of the earth. Where the formation or a portion of the formation to be treated is at the bottom of the well, a packer may be positioned in the well at a point just above the formation or portion thereof to be treated. The solution is then introduced into the formation through tubing extending below the packer. Where the formation or portion thereof to be treated is located above the bottom of the well, i.e., between the surface of the earth and the bottom of the well, a pair of packers may be positioned in the well to straddle the formation or portion thereof to be treated. The solution is then introduced into the formation through tubing extending through the upper packer and terminating between the packers. A balanced column technique may also be employed in the treatment of a formation to reduce water coning. In this technique, the tubing and the annulus between the tubing and casing is filled with oil, for example, lease crude oil. The oil is then displaced from the tubing by the solution of sodium silicate and urea until the water-oil interface in the well is at substantially the same level as the water-oil interface in the formation. A water-oil interface detector is employed for determining the level of the water-oil interface in the well. The water-oil interface is then held constant by maintaining the balanced column of oil in the annulus. The remainder of the solution of sodium silicate and urea is then pumped from the tubing and into the formation below the water-oil interface. It will be appreciated that during this time the tendency of the water-oil interface in the well to rise (for example, by oil in the balanced column passing into the adjacent oil bearing formation) will be counterbalanced by pumping additional oil into the annulus. Principles of operations employing balanced fluid columns with an interface therebetween are described in further detail in "Selective Plugging of Injection Wells by In Situ Reactions," Journal of Petroleum Technoloy, January 1757, pages 17–20. For the treatment of a production well to reduce gas coning, a packer is positioned in the annulus at a point below the gas-oil interface in the producing formation. The tubing is then filled with oil, for example, lease crude oil. The solution of sodium silicate and urea is pumped through the annulus between the tubing and the casing and is thus introduced into the formation above the packer. The solution distributes itself within the formation below the gas-oil interface. Maintenance of the column of oil in the tubing results in maintenance of a fluid pressure below the packer to insure against packer leaks. In the procedures described above, it is preferred to follow the solution of sodium silicate and urea with a slug of oil to insure that none of the solution remains in the tubing or casing to cause plugging after setting.

It is preferred, following introduction of the aqueous solution of sodium silicate and urea into the formation, to permit the solution to remain immobile therein for a suitable time to insure adequate setting of the hydrogel. Immobility of the solution may be effected by closing in the well through the tubing or annulus or through both the tubing and annulus as may be required. The time necessary to insure adequate setting of the hydrogel will depend primarily upon the temperature of the formation. However, setting times of three or four hours after introduction of the aqueous solution into the formation will usually be sufficient. On the other hand, longer setting times may be employed as desired. Following the termination of the setting time, the packers, if any, can be removed and production from the well or injection into the well, as the case may be, can be effected.

The following examples will be illustrative of the effect of temperature, and of the composition of the aqueous solution of sodium silicate and urea, on the setting times of the hydrogel.

In each of the examples, a solution was prepared containing sodium silicate, urea, and water. The sodium silicate had a molar ratio of sodium oxide to silicon dioxide of 1:3.22. Further, the sodium silicate was employed in the form of its aqueous solution and the solution had a density of 40° Baumé. Each of the solutions following preparation was maintained at an elevated temperature. The times required for the sodium silicate and the urea to react to form a hydrogel were then measured. The table gives the results obtained.

TABLE

| Example No. | Composition of Solution Weight Percent | | | Temperature, °F. | Setting Time, Hours |
|---|---|---|---|---|---|
| | Na$_2$SiO$_3$ | Urea | Water | | |
| 1 | 3.4 | 8.9 | 87.7 | 145 | >24 |
| 2 | 3.8 | 12.6 | 83.6 | 145 | 12 |
| 3 | 3.7 | 16.0 | 80.3 | 145 | 12 |
| 4 | 3.5 | 10 | 86.5 | 150 | >24, <48 |
| 5 | 3.5 | 9 | 87.5 | 162 | >5, <16 |
| 6 | 4.1 | 4.6 | 91.3 | 170 | >24 |
| 7 | 3.4 | 8.9 | 87.7 | 170 | 16 |
| 8 | 3.8 | 12.6 | 83.6 | 170 | 6.5 |
| 9 | 3.7 | 16.1 | 80.2 | 170 | 6 |
| 10 | 3.6 | 6 | 90.4 | 182 | >5, <20 |
| 11 | 3.7 | 3 | 93.3 | 196 | 5 |
| 12 | 3.7 | 3 | 93.3 | 225 | 2 |
| 13 | 3.7 | 1.5 | 94.8 | 300 | >1, <2 |

From the foregoing, it will be seen that an effective process for reducing the permeability of earth formations having a temperature of at least 145° F. and penetrated by a well has been provided. By the process, effective reduction of gas or water coning in the well during production of petroleum oil can be obtained. Further, effective reduction of permeability of formations penetrated by an injection well to prevent loss of injection fluids can be obtained.

Having thus described my invention, it will be understood that such description has been given by way of illustration and example and not by way of limitation, reference for the latter purpose being had to the appended claims.

I claim:

1. A method for treating a permeable subterranean formation having a temperature in excess of about 145° F. and penetrated by a well comprising introducing into said formation an aqueous solution of sodium silicate and urea and immobilizing said aqueous solution in said formation for a sufficient period of time for said sodium silicate and urea to react to form a hydrogel of silica within said formation whereby the permeability of said formation to the flow of fluid is reduced.

2. A method for treating a permeable subterranean formation having a temperature in excess of about 145° F. and penetrated by a well, which subterranean formation is productive of petroleum to said well and is subject to water coning, comprising introducing into the lower portion of said formation through said well an aqueous solution of sodium silicate and urea and immobilizing said aqueous solution in said lower portion of said formation for a sufficient period of time for said sodium silicate and urea to react to form a hydrogel of silica within said lower portion of said formation, whereby flow of water from said lower portion of said formation into said well is reduced.

3. A method for treating a permeable subterranean formation having a temperature in excess of about 145° F. and penetrated by a well, which subterranean formation is productive of petroleum to said well and is subject to gas coning, comprising introducing into the upper portion of said formation through said well an aqueous solution of sodium silicate and urea, and immobilizing said aqueous solution in said upper portion of said formation for a sufficient period of time for said sodium silicate and urea to react to form a hydrogel of silica within said upper portion of said formation, whereby flow of gas from said upper portion of said formation into said well is reduced.

4. A method of treating a permeable subterranean formation having a temperature in excess of about 145° F. and penetrated by a well comprising positioning packer means within said well to isolate said formation from the remainder of the subterranean formations penetrated by said well, introducing into said formation from tubing extending through said well from the surface of the earth to below said packer means an aqueous solution of sodium silicate and urea, and immobilizing said aqueous solution in said formation for a sufficient period of time for said sodium silicate and urea to react to form a hydrogel of silica within said formation, whereby the permeability of said formation to the flow of fluid is reduced.

5. A method of treating a permeable subterranean formation having a temperature in excess of about 145° F. and penetrated by a well comprising positioning a pair of packers within said well to isolate said formation from the remainder of the subterranean formations penetrated by said well, introducing into said formation from tubing extending through said well from the surface of the earth to between said pair of packers an aqueous solution of sodium silicate and urea, and immobilizing said aqueous solution in said formation for a sufficient period of time for said sodium silicate and urea to react to form a hydrogel of silica within said formation, whereby the permeability of said formation to the flow of fluid is reduced.

6. A method for treating a permeable subterranean formation having a temperature in excess of about 145° F. and penetrated by a well, which subterranean formation is productive of petroleum to said well and is subject to water coning, comprising filling said well with oil, introducing into said well through tubing extending from the surface of the earth an aqueous solution of sodium silicate and urea until the interface in said well between said solution and said oil is at substantially the level of the oil-water interface in said formation, closing in said well and maintaining the level of said interface in said well between said solution and said oil, introducing into said formation from said tubing an aqueous solution of sodium silicate and urea, and immobilizing said aqueous solution in said formation below said oil-water interface for a sufficient period of time for said sodium silicate and urea to react to form a hydrogel of silica within said formation below said oil-water interface, whereby flow of water from said formation into said well is reduced.

7. A method for treating a permeable subterranean formation having a temperature in excess of about 145° F. and penetrated by a well provided with tubing and casing, which subterranean formation is productive of petroleum to said well and is subject to gas coning comprising positioning a packer in said well at a point below the gas-oil interface within said formation, said tubing terminating at a point substantially immediately below said packer, filling said tubing with oil, pumping through the annulus between said tubing and said casing an aqueous solution of sodium silicate and urea, introducing said aqueous solution into said formation above said packer, and immobilizing said aqueous solution in said formation for a sufficient period of time for said sodium silicate and urea to react to form a hydrogel of silica within said formation, whereby flow of gas from said formation into said well is reduced.

8. A method according to claim 1, wherein said formation is at a depth of at least about 5000 feet.

9. A method for treating a permeable subterranean formation having a temperature of at least about 145° F. and penetrated by a well comprising introducing into said formation an aqueous solution of between about 2.7 percent and 30 percent by weight of sodium silicate and between about 1.5 percent and 25 percent by weight of urea and immobilizing said aqueous solution in said formation for a sufficient period of time for said sodium silicate and urea to react to form a hydrogel of silica within said formation whereby the permeability of said formation to the flow of fluid is reduced.

References Cited by the Examiner

UNITED STATES PATENTS

| | | | |
|---|---|---|---|
| 2,365,039 | 12/1944 | Andresen | 166—29 |
| 2,761,511 | 9/1956 | Billue | 166—29 |
| 2,784,787 | 3/1957 | Mathews et al. | 166—42 X |
| 2,923,356 | 2/1960 | Glass et al. | 166—21 X |
| 2,968,572 | 1/1961 | Peeler. | |
| 3,059,997 | 10/1962 | Schwartz | 252—317 X |

CHARLES E. O'CONNELL, *Primary Examiner.*

T. A. ZALENSKI, *Assistant Examiner.*